US011310953B2

(12) United States Patent
Schoeny et al.

(10) Patent No.: US 11,310,953 B2
(45) Date of Patent: Apr. 26, 2022

(54) SYSTEM AND METHOD FOR CALIBRATING LOAD SENSORS OF AN AGRICULTURAL IMPLEMENT

(71) Applicant: CNH Industrial America LLC, New Holland, PA (US)

(72) Inventors: Christopher Schoeny, Minooka, IL (US); Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 238 days.

(21) Appl. No.: 16/460,458

(22) Filed: Jul. 2, 2019

(65) Prior Publication Data

US 2021/0003470 A1 Jan. 7, 2021

(51) Int. Cl.
*A01C 7/20* (2006.01)
*G01L 25/00* (2006.01)
(Continued)

(52) U.S. Cl.
CPC .............. *A01C 7/205* (2013.01); *A01B 63/22* (2013.01); *A01B 63/32* (2013.01); *A01B 79/005* (2013.01);
(Continued)

(58) Field of Classification Search
CPC ....... A01B 63/22; A01B 63/32; A01B 79/005; A01B 79/02; A01C 5/06; A01C 7/205; A01C 7/208; A01C 14/00; G01L 25/00
See application file for complete search history.

(56) References Cited

U.S. PATENT DOCUMENTS 3,749,035 A 7/1973 Cayton et al.
4,353,247 A 10/1982 De Domenico
(Continued)

FOREIGN PATENT DOCUMENTS

BR 102015030677 A2 6/2017
CN 109283076 A 1/2019

OTHER PUBLICATIONS

NIST/SEMATECH e-Handbook of Statistical Methods, last updated Oct. 30, 2013, accessed Apr. 16, 2021 4.6.1. Load Cell Calibration, 4.6.1.1. Background & Data, 4.6.1.3. Model Fitting—Initial Model, 4.6.1.7. Model Fitting—Model #2 https://www.itl.nist.gov/div898/handbook/pmd/section6/pmd61.htm (Year: 2013).*

(Continued)

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

A system for calibrating load sensors installed on an agricultural implement. The system includes a load sensor provided in operative association with a ground engaging tool and configured to capture load data indicative of a load applied to the ground-engaging tool. The system also includes a controller communicatively coupled to the load sensor configured to determine first and second load values based on the load data received from the load sensor when the down force actuator is disposed at first and second actuator positions so as to apply first and second down forces, respectively, against the ground engaging tool. The controller is also configured to determine a relationship between the first and second load values and corresponding force values associated with the first down force and the second down force.

20 Claims, 4 Drawing Sheets

(51) Int. Cl.
*A01B 63/22* (2006.01)
*A01B 79/02* (2006.01)
*A01B 63/32* (2006.01)
*A01B 79/00* (2006.01)
*A01C 14/00* (2006.01)

(52) U.S. Cl.
CPC .............. *A01B 79/02* (2013.01); *G01L 25/00* (2013.01); *A01C 7/208* (2013.01); *A01C 14/00* (2013.01)

(56) References Cited

U.S. PATENT DOCUMENTS

| | | | |
|---|---|---|---|
| 5,012,415 | A | 4/1991 | Boe et al. |
| 6,389,999 | B1 | 5/2002 | Duello |
| 6,547,012 | B2 | 4/2003 | Scarlett et al. |
| 6,615,114 | B1 | 9/2003 | Skiba et al. |
| 6,647,799 | B1 | 11/2003 | Raper et al. |
| 7,028,554 | B2 | 4/2006 | Adamchuk et al. |
| 8,275,525 | B2 | 9/2012 | Kowalchuk et al. |
| 8,561,472 | B2 | 10/2013 | Sauder et al. |
| 9,173,339 | B2 | 11/2015 | Sauder et al. |
| 9,750,174 | B2 | 9/2017 | Sauder et al. |
| 9,766,173 | B2 | 9/2017 | Stroock et al. |
| 9,968,030 | B2 | 5/2018 | Kowalchuk et al. |
| 10,188,025 | B2 | 1/2019 | Kirk et al. |
| 2008/0267719 | A1 | 10/2008 | Corcoran |
| 2016/0358737 | A1* | 12/2016 | Brooks .............. H03K 17/9625 |
| 2018/0210434 | A1* | 7/2018 | Iwatake ................. B25J 13/085 |
| 2019/0162855 | A1* | 5/2019 | McPeek ................. A01G 22/00 |
| 2019/0380259 | A1* | 12/2019 | Frank ..................... A01C 5/068 |
| 2020/0396894 | A1* | 12/2020 | Radtke ................. A01B 63/008 |

OTHER PUBLICATIONS

Strainsert, Force Sensor Calibration Service, Jun. 4, 2019 webpage captured by Wayback Machine Internet Archive, https://web.archive.org/web/20190604154631/https://www.strainsert.com/services/force-sensor-calibration/ (Year: 2019).*

Ismail Z. Ebrahim et al., "Simulation of Down Force for No-Till Seeder Using Ultrasonic and Arduino Elements," J.Soil Sci. and Agric. Eng., Mansoura Univ., vol. 8 (10): 509-515, 2017 Jan. 2017 (7 pages) https://www.researchgatye.net/publication/322056643.

* cited by examiner

SYSTEM AND METHOD FOR CALIBRATING LOAD SENSORS OF AN AGRICULTURAL IMPLEMENT

FIELD OF THE INVENTION

The present disclosure generally relates to agricultural implements and, more particularly, to systems and methods for calibrating load sensors associated with ground engaging tools of an agricultural implement.

BACKGROUND OF THE INVENTION

Certain agricultural implements include ground engaging tools configured to interact with the soil. For example, seed-planting implements typically include one or more furrow forming tools or openers that form a furrow or trench in the soil. One or more dispensing devices of the seed-planting implements may, in turn, deposit the seeds into the furrow(s). After deposition of the seeds, a furrow closing assembly may close the furrow in the soil and a packer wheel may pack the soil on top of the deposited seeds. In certain configurations, a seed-planting implement may include one or more residue removal devices positioned forward of the opener(s), the closing assembly, and the packer wheel of the seed-planting implement relative to the direction of travel of the implement. In general, the residue removal device(s) are configured to break up and sweep away residue and dirt clods present within the path of the implement.

Agricultural implements, such as seed-planting implements, typically include one or more actuators (e.g., hydraulic cylinders, pneumatic cylinders, or electric motors) configured apply a downforce to one or more of the tools such that the tools properly engage the ground. The actuator(s) may also move the ground engaging tools between a lowered/ground engaging position and a raised/transport position (e.g., to facilitate repositioning the implement between successive rows). The actuator(s) are typically controlled by an electronic control system having one or more electronically operated valves (or drivers in the case of electric motor actuators) configured, for example, to control fluid flow (e.g., hydraulic fluid flow) to the actuator(s) in an automatic control mode.

In certain instances, an agricultural implement may include one or more load cells in association with one or more of its ground engaging tools to communicate the load applied to such tool(s). These load cells typically require calibration in order to ensure the accuracy of the load readings. For instance, the factory calibration of the load cells can degrade over time via creep and reduce the effectiveness of the load cell, resulting in under or over estimation of the load applied to the tool(s).

Accordingly, a system and method for calibrating load sensors associated with ground engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for calibrating load sensors installed on an agricultural implement. The system includes a frame and a ground engaging tool coupled to the frame. The system further includes a down force actuator coupled to the frame and configured to be actuated to apply a down force against the ground engaging tool. The system additionally includes a load sensor provided in operative association with the ground engaging tool and configured to capture load data indicative of a load applied to the ground-engaging tool. The system also includes a controller communicatively coupled to the load sensor. The controller is configured to determine a first load value based on the load data received from the load sensor when the down force actuator is disposed at a first actuator position so as to apply a first down force against the ground engaging tool. The controller is further configured to determine a second load value based on the load data received from the load sensor when the down force actuator is disposed at a second actuator position so as to apply a second down force against the ground engaging tool. The controller is also configured to determine a relationship between the first and second load values and corresponding force values associated with the first down force and the second down force.

In another aspect, the present subject matter is directed to a method for calibrating load sensors installed on an agricultural implement. The agricultural implement includes a frame, a ground engaging tool coupled to the frame, and a down force actuator coupled to the frame. The down force actuator is configured to apply a down force against the ground engaging tool. The method includes determining, with a computing device, a first load value indicative of a load being applied to the ground engaging tool based on load data received from a load sensor while the down force actuator is disposed at a first actuator position so as to apply a first down force against the ground engaging tool, with the load sensor being provided in operative association with the ground engaging tool. The method also includes controlling, with the computing device, an operation of the down force actuator such that the down force actuator is actuated from the first actuator position to a second actuator position so as to apply a second down force against the ground engaging tool. The method further includes determining, with the computing device, a second load value indicative of the load being applied to the ground engaging tool based on load data received from the load sensor while the down force actuator is disposed at the second actuator position. Additionally, the method includes determining, with the computing device, a relationship between the first and second load values and corresponding force values associated with the first down force and the second down force.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
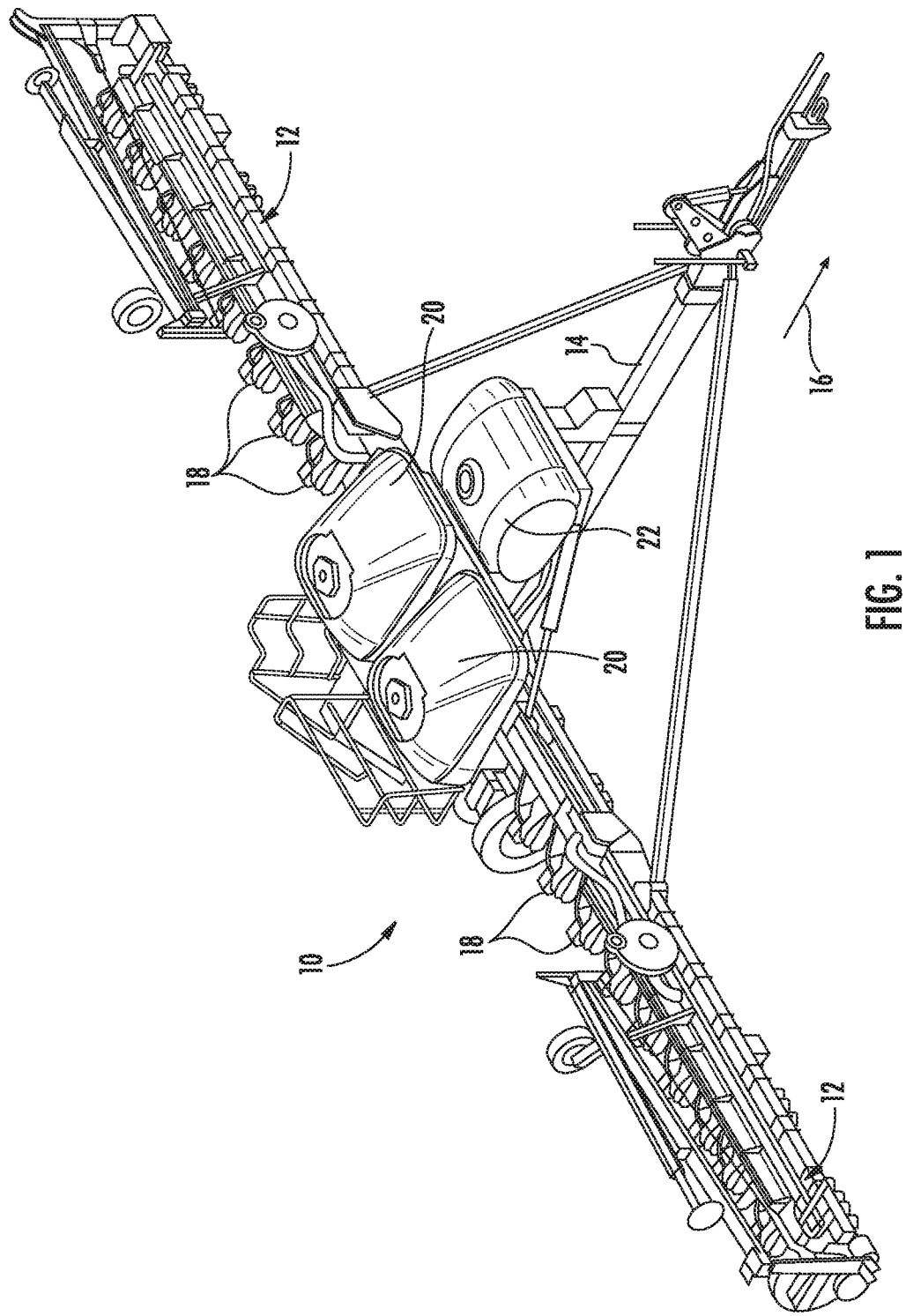
FIG. 1 illustrates a perspective view of one embodiment of an agricultural implement configured as a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for calibrating load sensors installed on an agricultural implement in order to determine a load(s) applied to one or more ground engaging tools of the implement as the implement is being moved across the field, such as load sensors installed on an implement to monitor the draft loads on one or more ground engaging tools and/or to monitor the down force applied to one or more ground engaging tools. In several embodiments, the disclosed system may be configured to calibrate a load sensor associated with a given ground engaging tool using separate down force data indicative of the load being applied through such ground engaging tools by a down force actuator of the implement. For example, a controller of the disclosed system may be configured to receive data indicative of the load applied to the ground engaging tool as the down force actuator is actuated to adjust the down force applied to the tool. In such an embodiment, the down force actuator may be actuated to two or more positions to vary the down force applied to the tool as the separate down force data is being monitored simultaneous with the load sensor outputs, thereby allowing a multi-point calibration to be performed. The controller may then correlate the separate down force data to the load sensor data to facilitate calibration of the load sensor.

For instance, in several embodiments, the controller may be configured to actuate the down force actuator to a first position to apply a first down force on the ground engaging tool while monitoring both the down force data associated with the down force actuator and the load data from the load sensor to be calibrated, thereby allowing the controller to capture a first data set including a first load value from the load sensor and a corresponding force value associated with the down force applied to the tool. Thereafter, the controller may be configured to actuate the down force actuator to a second position to apply a second down force on the ground engaging tool while again monitoring both the down force data associated with the down force actuator and the load data from the load sensor to capture a second data set including a second load value from the load sensor and a corresponding force value associated with the second down force applied to the tool. The controller may then be configured to determine a relationship between the first and second load values and corresponding force values, such as by performing a regression analysis (e.g., a linear or non-linear regression analysis). Using the determined relationship between the load values and corresponding force values, the controller may calibrate the load sensor, such as by modifying a look-up table, mathematical formula, and/or algorithm stored within the memory of the controller that correlates the load data received from the load sensor to resulting load values.

Referring now to the drawings, FIG. 1 illustrates a perspective view of one embodiment of a seed-planting implement 10 in accordance with aspects of the present subject matter. It should be appreciated that, although the seed-planting implement 10 illustrated herein corresponds to a planter, the seed-planting implement 10 may generally correspond to any suitable equipment or implement, such as a seeder (e.g., a seed disc drill) or another seed dispensing implement, a side dresser or another fertilizer dispensing implement, a strip tiller, tillage implement, and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, in general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the seed-planting implement 10 described above and shown in FIG. 1 is provided only to place the present subject matter in an exemplary field of use. Thus, it should be appreciated that the present subject matter may be readily adaptable to any manner of implement configuration.

Figure 2:
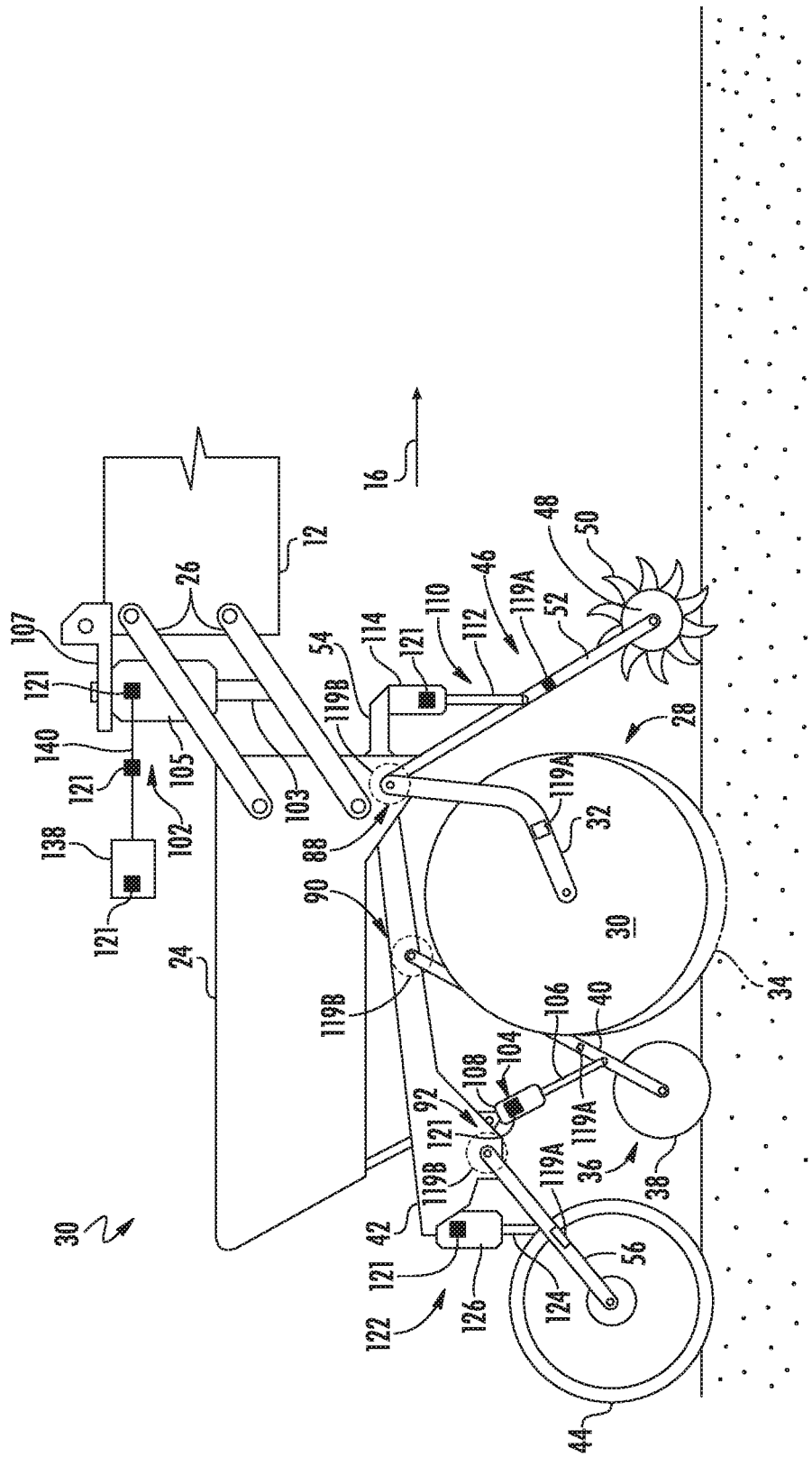
FIG. 2 illustrates a side view of one embodiment of a row unit suitable for use with a seed-planting implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner.

As illustrated, a row unit actuator 102 may be configured to move or otherwise adjust the position of the frame 24 relative to the toolbar 12. Moreover, by adjusting the position of the frame 24, the position of various ground engaging tools coupled to the frame 24 may be adjusted relative to the ground. For example, as shown, a first end of the actuator 102 (e.g., a rod 103 of the actuator 102) may be coupled to one or more of the links 26, while a second end of the actuator 102 (e.g., a cylinder 105 of the actuator 102) may be coupled to a bracket 107, which is, in turn coupled to the toolbar 12. The rod 103 of the actuator 102 may be configured to extend and/or retract relative to the cylinder 105 to adjust the downforce being applied to the frame 24. As such, the downforce applied to one or more ground engaging tools (e.g., a press wheel 44, closing discs 38, opening assembly 28, and/or residue removal wheels 48) may be adjusted. In addition, such extension and/or retraction may move the frame 24 and associated ground engaging tools between an operating position relative to the ground in which the tools engage the soil and a raised position relative to the ground in which the tools are lifted out of the soil. In the illustrated embodiment, the actuator 102 corresponds to a fluid-driven actuator, such as a hydraulic or pneumatic cylinder. However, it should be appreciated that the actuator 102 may correspond to any other suitable type of actuator, such as an electric linear actuator. Additionally, it should be appreciated that, in alternative embodiments, the actuator 102 may control the position(s) of the ground engaging tool(s) by adjusting the downforce being applied to the ground engaging tool(s).

As shown in FIG. 2, the row unit 18 also includes a furrow opening assembly 28. For example, in one embodiment, the furrow opening assembly 28 may include a gauge wheel 30 operatively coupled to the frame 24 of the row unit 18 via a support arm 32. Furthermore, the opening assembly 28 may also include one or more opener discs 34 configured to excavate a furrow or trench in the soil. As is generally understood, the gauge wheel 30 may be configured to engage the top surface of the soil as the implement 10 is moved across the field. In this regard, the height of the opener disc(s) 34 may be adjusted with respect to the position of the gauge wheel 30 to set the desired depth of the furrow being excavated.

Moreover, as shown, the row unit 18 may include a furrow closing assembly 36. Specifically, in several embodiments, the furrow closing assembly 36 may include a pair of closing discs 38 positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38.

In one embodiment, an actuator 104 may be configured to move or otherwise adjust the position of the furrow closing assembly 36 relative to the frame 24. For example, as shown in the illustrated embodiment, a first end of the actuator 104 (e.g., a rod 106 of the actuator 104) may be coupled to the support arm 40 of the furrow closing assembly 36, while a second end of the actuator 104 (e.g., the cylinder 108 of the actuator 104) may be coupled to the chassis arm 42, which is, in turn, coupled to the frame 24. The rod 106 of the actuator 104 may be configured to extend and/or retract relative to the cylinder 108 to adjust the downforce being applied to and/or the penetration depth of the closing disc(s) 38. In addition, such extension and/or retraction may move the furrow closing assembly 36 between an operating position relative to the ground in which the closing disc(s) 38 engages the soil and a raised position relative to the ground in which the closing disc(s) 38 is lifted out of the soil. In the illustrated embodiment, the actuator 104 corresponds to a fluid-driven actuator, such as a hydraulic or pneumatic cylinder. However, it should be appreciated that the actuator 104 may correspond to any other suitable type of actuator, such as an electric linear actuator. Additionally, it should be appreciated that, in alternative embodiments, the actuator 104 may control the position(s) of the closing disc(s) 38 by adjusting the downforce being applied to the closing disc(s) 38.

Additionally, the row unit 18 may include a press wheel 44 configured to roll over the closed furrow to firm the soil over the seed and promote favorable seed-to-soil contact. Moreover, the row unit 18 may include a support arm 56 configured to adjustably coupled the press wheel 44 to the frame assembly 24. For example, one end of the support arm 56 may be pivotably coupled to the press wheel 44, while an opposed end of the support arm 56 may be pivotably coupled to the chassis arm 42, which is, in turn, coupled to the frame 24. However, it should be appreciated that, in alternative embodiments, the press wheel 44 may be coupled to the frame 24 in any other suitable manner. Furthermore, although only one press wheel 44 is shown in FIG. 2, it should be appreciated that, in alternative embodiments, row unit 18 may include any other suitable number of press wheels 44. For example, in one embodiment, the row unit 18 may include two or more press wheels 44.

In several embodiments, an actuator 122 may be configured to move or otherwise adjust the position of the press wheel 44 relative to the frame 24. For example, as shown in the illustrated embodiment, a first end of the actuator 122 (e.g., a rod 124 of the actuator 122) may be coupled to the support arm 56, while a second end of the actuator 122 (e.g., the cylinder 126 of the actuator 122) may be coupled to the chassis arm 42, which is, in turn, coupled to the frame 24. The rod 124 of the actuator 122 may be configured to extend and/or retract relative to the cylinder 126 to adjust the downforce being applied to the press wheel 44. As such, increasing the downforce being applied to the press wheel 44 may increase the aggressiveness with which the press wheel 44 compacts the soil over the seed. Conversely, decreasing the downforce being applied to the press wheel 44 may decrease the aggressiveness with which the press wheel 44 compacts the soil over the seed. In addition, such extension and/or retraction may move the press wheel 44 between an operating position relative to the ground in which the press wheel 44 engages the soil and a raised position relative to the ground in which the press wheel 44 is lifted from engagement with the soil. In the illustrated embodiment, the actuator 122 corresponds to a fluid-driven actuator, such as hydraulic or pneumatic cylinder. However, it should be appreciated that the actuator 122 may correspond to any other suitable type of actuator, such as an electric linear actuator.

Moreover, a residue removal device 46 may be positioned at the forward end of the row unit 18 relative to the direction of travel 16. In this regard, the residue removal device 46 may be configured to break up and/or sweep away residue, dirt clods, and/or the like from the path of the row unit 18 before the furrow is formed in the soil. For example, in one embodiment, the residue removal device 46 may include one or more residue removal wheels 48, with each wheel 48 having a plurality of tillage points or fingers 50. As such, the wheel(s) 48 may be configured to roll relative to the soil as the implement 10 is moved across the field such that the fingers 50 break up and/or sweep away residue and dirt clods. Additionally, the residue removal device 46 may include a support arm 52 configured to adjustably couple the residue removal wheel(s) 48 to the frame assembly 24. For example, one end of the support arm 52 may be pivotably coupled to the wheel(s) 48, while an opposed end of the support arm 52 may be pivotably coupled to the frame 24 or an intermediary component, which is, in turn, coupled to the frame 24. However, it should be appreciated that, in alternative embodiments, the residue removal wheel(s) 48 may be coupled to the frame 24 in any other suitable manner. Furthermore, although only one residue removal wheel 48 is shown in FIG. 2, it should be appreciated that, in alternative embodiments, the residue removal device 46 may include any other suitable number of residue removal wheels 48. For example, in one embodiment, the residue removal device 46 may include a pair of residue removal wheels 48.

In several embodiments, an actuator 110 may be configured to move or otherwise adjust the position of the residue removal device 46 relative to the frame 24. For example, as shown in the illustrated embodiment, a first end of the actuator 110 (e.g., a rod 112 of the actuator 110) may be coupled to the support arm 52 of the residue removal device 46, while a second end of the actuator 110 (e.g., the cylinder 114 of the actuator 110) may be coupled to a bracket 54, which is, in turn, coupled to the frame 24. The rod 112 of the actuator 110 may be configured to extend and/or retract relative to the cylinder 114 to adjust the downforce being applied to the residue removal wheel(s) 48. As such, increasing the downforce being applied to the residue removal wheel(s) 48 may increase the aggressiveness with which the removal wheel(s) 48 breaks up and sweeps away the residue and/or dirt clods. Conversely, decreasing the downforce being applied to the residue removal wheel(s) 48 may decrease the aggressiveness with which the removal wheel(s) 48 breaks up and sweeps away the residue and/or dirt clods. In addition, such extension and/or retraction may move the residue removal device 46 between an operating position relative to the ground in which the residue removal wheel(s) 48 engages the soil and a raised position relative to the ground in which the residue removal wheel(s) 48 is lifted out of the soil. In the illustrated embodiment, the actuator 110 corresponds to a fluid-driven actuator, such as hydraulic or pneumatic cylinder. However, it should be appreciated that the actuator 110 may correspond to any other suitable type of actuator, such as an electric linear actuator.

It should be appreciated that though actuators 102, 104, 122, 110 are described herein as providing a down force, the actuators 102, 104, 122, 110 may also provide a lift force. For instance, the actuators 102, 104, 122, 110 may provide a vertically upward force in order to raise the respective ground-engaging tools to the raised position.

Further, in several embodiments, one or more load sensors 119 may be provided in operative association with one or more of the ground engaging tools of the row unit 18 for detecting the load applied to such tool(s). For instance, in one embodiment, a load sensor(s) 119A may be coupled to one or more of the support arms 32, 40, 52, 56 of the opening assembly 28, closing assembly 36, the residual removal device 46, and/or the press wheel 44. As such, the load sensor 119A may be configured to detect a parameter associated with the draft load being applied to the opening assembly 28, closing assembly 36, the residual removal device 46, and/or the press wheel 44 as the implement 10 is moved across the field. For example, in one embodiment, the load sensor(s) 119A may be configured as strain gauge(s) mounted on the support arm(s) 32, 40, 52, 56 and configured to detect the force exerted thereon by the draft load on the associated ground engaging tool(s). Alternatively, one or more of the load sensors 119A may be configured as a load pin or cell configured to be provided in operative association with a given ground engaging tool(s) to monitor the draft load applied thereto.

In another embodiment, the load sensors 119 may be configured to detect the down force applied to one or more of the ground engaging tools of the row unit 18 (e.g., the gauge wheel 30, the opener disc(s) 34, the closing disc(s) 38, residue removal wheel(s) 48, and/or press wheel(s) 44). In such an embodiment, each load sensor 119 may correspond to any suitable sensor (e.g., a load cell or pin) and may be configured to be positioned at any suitable location relative to an associated ground engaging tool that allows the sensor 119 to monitor the down force applied through such tool (e.g., by positioning the sensor 119 at or adjacent to the rotational axis of one of the rotating ground engaging tools). For instance, as shown in FIG. 2, a load sensor 119B may installed at or adjacent to one or more pivot points of the ground engaging tools of the row unit 18. As shown in the illustrated embodiment, a load sensor 119B may be installed at or adjacent to pivot points 88, 90, 88, 92 associated with support arms 32, 40, 52, 56, respectively. As such, the load sensor 119B may be configured to detect a parameter associated with the draft load being applied to the opening assembly 28, closing assembly 36, the residual removal device 46, and/or the press wheel 44 as the implement 10 is moved across the field. However, it should be appreciated the load sensor(s) 119B may be provided at any other pivot point(s) associated with one or more of the ground engaging tools. In several embodiments, the load sensor(s) 119B may be configured to detect the load applied through one or more pivot members coupled between the respective ground engaging tool and the frame 24 and/or chassis arm 42 at the pivot point(s) 88, 90, 92 as the implement 10 is being moved across the field to perform an associated agricultural operation. For example, the load sensor(s) 119B may be coupled to one or more of the pivot members and/or between the pivot member(s) and the respective ground engaging tool, the chassis arm 42, the frame 28, and/or the toolbar 12 to allow force data associated with the load on the ground engaging tool(s) to be captured.

In one embodiment, the load sensor(s) 119B may be configured as a load pin assembly configured to detect the load acting on the pivot member(s). Specifically, any of the pivot members and the load sensor(s) 119B may together form at least part of the load pin assembly. As is generally understood, a load pin generally operates by sensing the force that is applied through the pin, such as by using internal strain gauges installed at the center of the pin. As another example, in an additional or alternative embodiment, the load sensor(s) 119B may be configured as a load sensor that is coupled to the pivot member(s) and/or that is coupled between and the components pivotably coupled together with such pivot member(s). As yet another example, the load sensor(s) 119B may be configured as a strain gauge coupled to the pivot member(s) to detect the load acting directly on the pivot member(s). It should be appreciated that the load sensor(s) 119B may be configured to separately detect a parameter associated with two or more components of the draft load being applied to the respective ground engaging tool(s). For instance, the load sensor(s) 119B may be oriented to separately detect a parameter associated with a vertical component and a horizontal component relative to the ground of the draft load applied to the respective ground engaging tool(s). For instance, the load sensor(s) 119B may separately detect the down force component of the draft load applied to the respective ground engaging tool(s).

It should be appreciated that, in alternative embodiments, the load sensor(s) 119 may be configured as any other suitable device for sensing or detecting a parameter indicative of load applied to a respective ground engaging tool(s).

Moreover, in several embodiments, one or more actuator sensors 121 may be provided in operative association with one or more of the actuators 102, 104, 110, 122 of the row unit 18 to detect a parameter associated with the down force being applied by such actuators against the respective tool(s) of the row unit 18. For example, as shown in FIG. 2, an actuator sensor 121 may be provided in operative association with the row unit actuator 102 to provide sensor data indicated of the down force being applied to the row unit 18. Additionally, as shown in FIG. 2, one or more actuator sensors 121 may be provided in operative association with one or more of the other actuators of the row unit 18, such as actuators 104, 110, 122.

As indicated above, in one embodiment, one or more of the actuators 102, 104, 110, 122 may correspond to fluid-driven actuators, such as hydraulic or pneumatic cylinders. In such an embodiment, each actuator sensor 121 may, for example, correspond to a pressure sensor configured to detect a fluid pressure associated with the fluid supplied to the respective actuator, which, in turn, may be indicative of the down force applied by such actuator to the row unit 18 or an individual component/assembly of the row unit 18. As shown in FIG. 2, when a given actuator sensor 121 comprises a pressure sensor, the sensor 121 may be provided in fluid communication with a control valve 138 configured to regulate the supply of fluid to the associated actuator or a fluid coupling 140 extending between the valve and the actuator (e.g., as shown in FIG. 2 in association with the row unit actuator 102) or the sensor 121 may be provided internally within the actuator (e.g., as shown in FIG. 2 in association with actuators 104, 110, 122). In an alternative embodiment, one or more of the actuators 102, 104, 110, 122 may correspond to electric linear actuators. In such an embodiment, each actuator sensor 121 may, for example, correspond to an electrical input sensor configured to detect an electrical input applied to its respective actuator, which may, in turn, be indicative of the down force applied by such actuator to the row unit 18 or an individual component/assembly of the row unit 18. For instance, each actuator sensor 121 may be configured to detect the current (or any other suitable electrical input) supplied to the associated actuator. It should be appreciated that, in other embodiments, the actuator sensor(s) 121 may correspond to any other suitable sensor capable of sensing or detecting a parameter indicative of the down force being applied by the associated actuator(s) 102, 104, 110, 122.

It should be appreciated that the configuration of the row unit 18 described above and shown in FIG. 2 is provided only to place the present subject matter in an exemplary field of use. Thus, it should be readily apparent to those of ordinary skill in the art that the present subject matter may be readily adaptable to any manner of row unit configuration. Additionally, it should be appreciated that, although the load sensor(s) 119 and actuator sensor(s) 121 have been described in the context of a single row unit 18, one or more load sensors 119 and actuator sensors 121 may, for example, be provided in operative association with the tools/actuators of each row unit 18 to allow both the load being applied to the ground engaging tools and the down force being applied by actuators to be monitored. It should be recognized that load sensors 119 separate from actuator sensor 121 may generally be provided to directly measure the load on the ground engaging tools due to row unit dynamics that may cause the down force applied to the various ground engaging tools by the actuator(s) 102, 104, 110, 122 to vary. For example, the pressure of the hydraulic actuator(s) may be modulated to maintain a target ground engaging tool load. Furthermore, it should also be appreciated that the implement has been described in the context of the seed-planting implement 10. However, such disclosure may be equally applicable to any other suitable agricultural implement.

Figure 3:
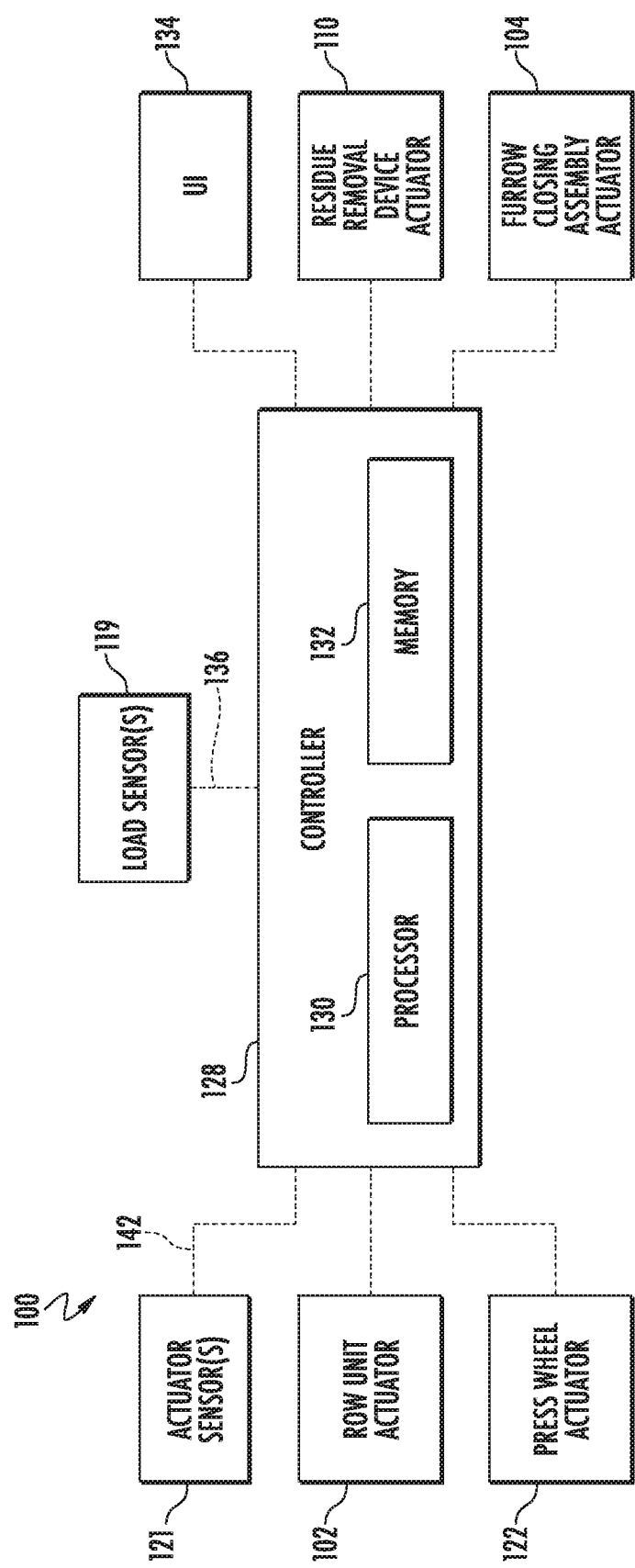
FIG. 3 illustrates a schematic view of one embodiment of a system for calibrating load sensors associated with one or more ground engaging tools of an agricultural implement in accordance with aspects of the present subject matter.

Referring now to FIG. 3, a schematic view of one embodiment of a system 100 for calibrating load sensors associated with one or more ground engaging tools of an agricultural implement is illustrated in accordance with aspects of the present subject matter. In general, the system 100 will be described herein with reference to the implement 10 and row unit 18 described above with reference to FIGS. 1 and 2. However, it should be appreciated by those of ordinary skill in the art that the disclosed system 100 may generally be utilized with seed-planting implements having any other suitable implement configuration and/or row units having any other suitable row unit configuration.

As shown in FIG. 3, the system 100 may include one or more components of the seed-planting implement 10 and/or the row unit 18 described above with reference to FIGS. 1 and 2, such as one or more of the various actuators 102, 104, 110, 122 provided in operative association with the row unit 18. Additionally, in several embodiments, the system 100 may include one or more sensors configured to capture data indicative of one or more operational parameter(s) of one or more components of the implement 10 and/or the row unit 18. For instance, as shown in FIG. 2, the system 100 may include one or more load sensors 119 configured to detect a parameter indicative of the load(s) applied to one or more of the ground engaging tools of the row unit 18, such as the opening assembly 28, closing assembly 36, residual removal device 46, and/or press wheel 44 of the row unit, and one or more actuator sensors 121 configured to detect a parameter indicative of the down force applied by one or more of the actuators 102, 104, 110, 122 of the row unit.

In accordance with aspects of the present subject matter, the system 100 may also include a controller 128 configured to electronically control the operation of one or more components of the implement 10. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 4. In addition, the controller 128 may also include various other suitable components, such as a communications circuit or module, one or more input/output channels, a data/control bus and/or the like.

It should be appreciated that the controller 128 may correspond to an existing controller of the implement 10 or an associated work vehicle (not shown) or the controller 128 may correspond to a separate processing device. For instance, in one embodiment, the controller 128 may form all or part of a separate plug-in module that may be installed within the implement 10 or associated work vehicle to allow for the disclosed system and method to be implemented without requiring additional software to be uploaded onto existing control devices of the implement 10 or the associated work vehicle.

Furthermore, in one embodiment, the system 100 may also include a user interface 134. More specifically, the user interface 134 may be configured to provide feedback (e.g., notifications associated with the monitored operational parameters of the ground engaging tools) to the operator of the implement 10. As such, the user interface 134 may include one or more feedback devices (not shown), such as display screens, speakers, warning lights, and/or the like, which are configured to communicate such feedback. In addition, some embodiments of the user interface 134 may include one or more input devices (not shown), such as touchscreens, keypads, touchpads, knobs, buttons, sliders, switches, mice, microphones, and/or the like, which are configured to receive user inputs from the operator. In one embodiment, the user interface 134 may be positioned within a cab of an associated work vehicle configured to tow the implement 10 across the field. However, in alternative embodiments, the user interface 134 may have any suitable configuration and/or be positioned in any other suitable location.

In several embodiments, the controller 128 may be configured to monitor one or more operational parameters of the ground engaging tools of the row unit 18 based on feedback received from associated sensors. Specifically, in one embodiment, the controller 128 may be communicatively coupled to the load sensors(s) 119 provided in operative association with one or more of the ground engaging tools (e.g., the opening assembly 28, closing assembly 36, residual removal device 46, and/or press wheel 44) via a wired or wireless connection to allow load-related sensor data (e.g., as indicated by dashed lines 136 in FIG. 3) to be transmitted from the load sensors(s) 119 to the controller 128. As such, the controller 128 may be configured to determine or estimate the load being currently applied to such tool(s) as the implement 10 is moved across the field based on the data 136 received from the load sensor(s) 119. For instance, the controller 128 may include a look-up table, mathematical formula, algorithm and/or any other suitable relationship (e.g., a sensor load/output curve) stored within its memory 132 that correlates the load-related sensor data 136 to the load applied to corresponding tool(s).

However, over time, the applicable look-up table, mathematical formula, algorithm, and/or other relationship stored within the controller's memory 132 that correlates the load-related sensor data 136 to the actual load being applied to the relevant ground engaging tool(s) may become less accurate. For instance, each load sensor 119 may be provided with a factory-calibrated load/output curve that correlates the sensor output or response to the load applied thereto. However, the factory-calibrated slope calculations for the sensor curve may degrade over time (e.g., due to sensor creep), thereby resulting in a load estimate based on the sensor data that is greater than or less than the actual load being applied to the sensor. When this occurs, the associated look-up table(s), mathematical formula(s), algorithm(s), and/or other relationship stored within the memory 132 of the controller 128 may no longer be used to accurately correlate the sensor data 136 to the actual load(s) being applied to the associated ground engaging tool(s).

In light of the potential for degradation of the response of the load sensor(s) 119, the controller 128 may be configured to automatically calibrate one or more of the load sensor(s) 119 utilizing a multi-point calibration. More particularly, the controller may be configured to modify data stored within the memory 132 that correlates the sensor data 136 to the load(s) being applied to the associated ground engaging tool(s) based on the performance of the multi-point calibration. For instance, the multi-point calibration may be utilized to modify values within a look-up table(s) stored within the controller's memory 132 and/or modify slope values or other values associated with a formula(s) and/or algorithm(s) stored within the controller's memory 132 that provides a mathematical expression of the sensor load/output curve. As such, the controller 128 may more accurately determine or estimate the load applied to the ground engaging tool(s) based on the data 136 communicated from the load sensor(s) 119.

In several embodiments, the controller 128 may be configured to calibrate the load sensor(s) 119 associated with a given ground engaging tool by monitoring the separate down force data provided via the actuator sensor(s) 121 that is configured to detect the down force applied through such ground engaging tool by an associated actuator of the row unit 18. Specifically, as indicated above, the controller 128 may be communicatively coupled to one or more actuator sensors 121 configured to detect a parameter indicative of the down force applied by one or more of the actuators 102, 104, 110, 122 of the row unit 18, thereby allowing the controller 128 to receive down force data (e.g., as indicated by line 142) indicative of the load being applied by such actuator(s) to an associated ground engaging tool(s) of the row unit 18. In such an embodiment, the relevant actuator(s) may be actuated to two or more positions to vary the down force applied to the associated tool as the down force data 142 received from the actuator sensor(s) 121 is being monitored simultaneous with the load-related sensor data 136 received from the load sensor(s) 119. By capturing both the down force data 142 and the load data 136 at each position to which the actuator(s) is moved, the controller 128 may perform the above-described multi-point calibration to properly calibrate the load sensor data 136. It should be appreciated that an agricultural operation of the agricultural implement 10 may be halted during the performance of such multi-point calibration such that implement 10 and components thereof are static or approximately static.

For example, in one embodiment, the controller 128 may be configured to control the operation of the row unit actuator 102 such that the actuator 102 is actuated to a first actuator position at which the actuator 102 applies a first down force against the ground engaging tools of the row unit 18. With the row unit actuator 102 at the first actuator position, the controller 128 may be configured to capture a first data set including a first load value based on the data 136 received from the load sensor(s) 119 and a corresponding force value associated with the down force being applied to the tool(s) by the actuator 102 at the first actuator position based on the data 142 received from the actuator sensor(s) 121. It should be appreciated that the first actuator position may correspond to any suitable actuator position across the full range of travel of the actuator 102 including a given actuator position at which the down force applied to the tool(s) corresponds to a zero force value or other nominal value (e.g., an actuator position at which the tool(s) is raised out of the ground).

Upon collecting the first data set, the controller 128 may be configured to control the operation of the row unit actuator 102 such that the actuator 102 is actuated from the first actuator position to a second actuator position (different than the first actuator position) at which the actuator 102 applies a second down force (different than the first down force) against the ground engaging tools of the row unit 18. With the row unit actuator 102 at the second actuator position, the controller 128 may be configured to capture a second data set including a second load value based on the data 136 received from the load sensor(s) 119 and a corresponding force value associated with the down force being applied to the tool(s) by the actuator 102 at the second actuator position based on the data 142 received from the actuator sensor(s) 121. It should be appreciated that the second actuator position may generally correspond to any suitable actuator position across the full range of travel of the actuator 102 at which the actuator 102 applies a different down force to the associated tool(s). For instance, if the first actuator position corresponds to a position at which the actuator 102 applies a down force of zero or some nominal value (e.g., a "zero load" position), the second actuator position will correspond to a position at which the actuator 102 applies a greater down force against the tool.

Using the data captured at the first and second actuator positions, the controller 128 may be configured to determine a relationship between the load values deriving from the load sensor(s) 119 and the corresponding force values deriving from the actuator sensor(s) 121. For instance, the controller 128 may be configured to perform a regression analysis (e.g., a linear or non-linear regression analysis) based on the first and second datasets, such as by utilizing the first and second load values as inputs (e.g., independent variables) and the corresponding force values as outputs (e.g., dependent variables) in order to determine a correlation between such data points.

In additional or alternative embodiments, the controller 128 may be configured to determine the relationship between a vertical component of the load values derived from the load sensor(s) 119 and the corresponding force values derived from the actuator sensor(s) 121. For example, the sensor(s) 119 may be configured to separately detect a parameter indicative of the vertical component of the load value applied to the ground engaging tool(s), such as embodiments of load sensor 119B described in association with FIG. 2. However, in an alternative embodiment, the controller 128 may be configured to determine the vertical component of the load force based on the position and/or orientation of the ground engaging tool and/or associated support arms 32, 40, 52, 56. For instance, the controller 128 may be communicatively coupled to one or more of the actuators 102, 104, 110 and/or actuator sensor(s) 121 via wired or wireless connection to allow position and/or orientation related data to be transmitted to controller 128. As such, the controller 128 may be configured to determine or estimate the vertical component of the load being currently applied to such tool(s). For instance, the controller 128 may include a look-up table, mathematical formula, algorithm and/or any other suitable relationship (e.g., a sensor load/output curve) stored within its memory 132 that correlates the load-related sensor data 136 and orientation and/or positon data of the ground engaging tool(s) to the vertical component of the load applied to corresponding tool(s). Furthermore, in certain embodiments, the vertical component of the load applied to the ground engaging tools may be the same or approximately the same as the down force applied to such tools.

It should be appreciated that, although the above-described calibration process only relied upon two datasets including data captured at two distinct actuator positions, the controller 128 may be configured to utilize multiple datasets including data captured at multiple different actuator positions to determine an accurate relationship between the load values deriving from the load sensor(s) 119 and corresponding force values deriving from the actuator sensor(s) 121. For instance, following actuation of the row unit actuator 102 to the first and second actuator positions, the controller 128 may be configured to actuate the actuator 102 to yet another actuator position (e.g., a third actuator positon) at which the actuator 102 applies a down force against the tool(s) (e.g., a third down force) that differs from the down force applied at the first and second actuator positions. Thereafter, the controller 128 may be configured to capture a third data set including a third load value based on the data 136 received from the load sensor(s) 119 and a corresponding force value associated with the down force being applied to the tool(s) by the actuator 102 at the third actuator position based on the data 142 received from the actuator sensor(s) 121. This process may be repeated at further actuator positions to capture additional datasets. The resulting datasets may then be analyzed (e.g., using a regression analysis) to calibrate the load sensor(s) 119.

As indicated above, in one embodiment, the controller 128 may be configured to perform a linear regression analysis to determine a mathematical relationship correlating the monitored load values to the corresponding known force values. Additionally, in embodiments where the controller 128 is configured to utilize more than two dataset points to establish the desired correlation, the controller may be configured to perform either a linear regression analysis or a non-linear regression analysis.

Moreover, as indicated above, the controller 128 may be configured to update the look-up table, mathematical formula, algorithm stored within its memory 132 based on the results of the calibration procedure. For instance, the controller 128 may be configured to modify the mathematical formula and/or algorithm (e.g., the slope and/or y-intercept) stored within its memory 132 in light of the relationship determined by the regression analysis. Additionally, or alternatively, the controller 128 may be configured to modify one or more values associated with a look-up table in light of the relationship determined by the regression analysis.

It should be appreciated that the above-described calibration procedure may be used by the controller 128 to calibrate each of the load sensors 119 provided on the implement 10. For example, the controller 128 may calibrate each of the load sensors 119 associated with the opening assembly 28, closing assembly 36, residual removal device 46, and/or press wheel 44 of each row unit 18. Furthermore, it should be appreciated that, although the calibration procedure was generally described above with reference to the row unit actuator 102, the same or a similar calibration procedure may also be applied using one or more of the other down force actuators of the row unit 18, such as the furrow closing assembly actuator 104, the residue removal device actuator 110, and/or the press wheel actuator 122. For instance, to calibrate the load sensor 119 associated with the closing assembly 36, the controller 128 may be configured to actuate the furrow closing assembly actuator 104 to two or more different actuator positions while simultaneously monitoring both the load data 136 from the sensor 119 to be calibrated and the force data 142 received from the associated actuator sensor 121 associated with the down force being applied by the actuator 104 on the closing assembly 36. The resulting datasets may then be analyzed as described above to calibrate the load sensor 119 for the closing assembly 36.

Figure 4:
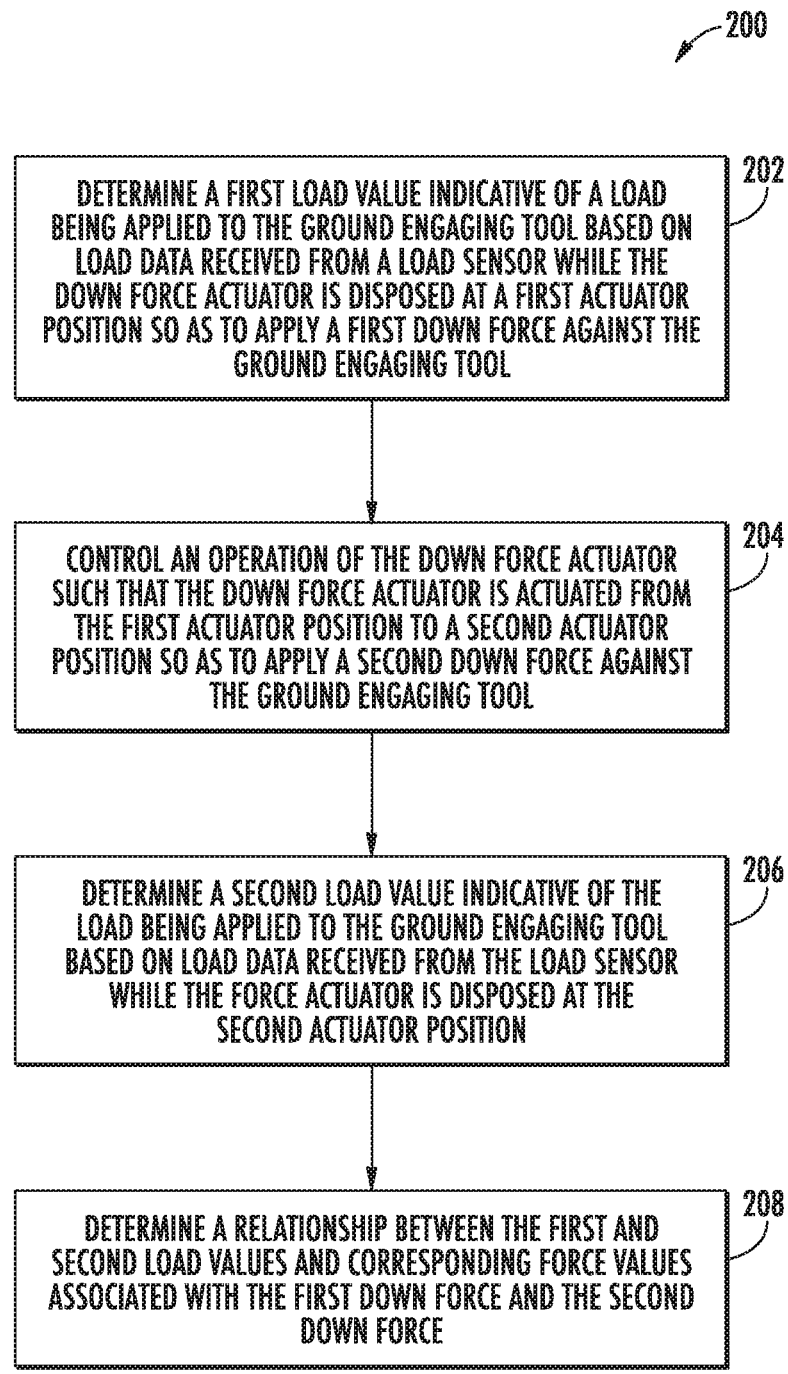
FIG. 4 illustrates a flow diagram of one embodiment of a method for calibrating load sensors installed on an agricultural implement in accordance with aspects of the present subject matter.

Referring now to FIG. 4, a flow diagram of one embodiment of a method 200 for calibrating load sensors installed on an agricultural implement is illustrated in accordance with aspects of the present subject matter. In general, the method 200 will be described herein with reference to the seed-planting implement 10 and the system 100 described above with reference to FIGS. 1-3. However, it should be appreciated by those of ordinary skill in the art that the disclosed method 200 may generally be utilized to calibrate the load sensors of any implement including ground engaging tools having any suitable implement configuration and/or in connection with any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include determining a first load value indicative of a load being applied to a ground engaging tool based on load data received from a load sensor while the down force actuator is disposed at a first actuator position so as to apply a first down force against the ground engaging tool. For example, as described above, the controller 128 may be configured to receive data 136 from a load sensor 119 indicative of the load being applied through one or more of the ground engaging tools of a row unit 18 (e.g., the opening assembly 28, closing assembly 36, residual removal device 46, and/or press wheel 44) while an associated down force actuator of the unit 18 is being used to apply a down force against the tool(s).

Additionally, at (204), the method 200 may include controlling an operation of the down force actuator such that the down force actuator is actuated from the first actuator position to a second actuator position so as to apply a second down force against the ground engaging tool. For instance, as described above, the controller 128 may be configured to control the operation of a given actuator 102, 104, 110, 122 such that the actuator is actuated from the first actuator position to a second actuator position different than the first actuator position. In one embodiment, as indicated above, the second actuator position may correspond to an actuator position at which the down force applied against the tool(s) is different than the down force applied against such tool(s) at the first actuator position.

Additionally, at (206), the method 200 may include determining a second load value indicative of the load applied to the ground engaging tool based on load data received from the load sensor while the down force actuator is disposed at the second actuator position. For example, as described above, the controller 128 may be configured to receive data 136 from the load sensor 119 indicative of the second load being applied through one or more of the ground engaging tools of the row unit 18 (e.g., the opening assembly 28, closing assembly 36, residual removal device 46, and/or press wheel 44) while an associated down force actuator of the unit 18 is being used to apply a down force against the tool(s).

In certain embodiments, it should be appreciated that one of the first actuator position or the second actuator position may correspond to a zero load position for the actuator 102, 104, 110, 122 such that the respective first down force or second down force is equal to a zero or other nominal value (e.g., an actuator position at which the tool(s) is raised out of the ground).

Furthermore, the method 200 may include determining the corresponding force values associated with the first down force and the second down force based on data received from an associated actuator sensor. For example, as described above, the controller 128 may be communicatively coupled to one or more actuator sensors 121 configured to provide force-related data 142 indicative of the down force being applied by the associated down force actuator 102, 104, 110, 122 at the first and second actuator positions.

Referring still to FIG. 4, at (208), the method 200 may include determining a relationship between the first and second load values and corresponding force values associated with the first down force and the second down force. For example, as explained above, the controller 128 may be configured to perform a regression analysis utilizing the first and second load values as inputs and/or independent variables and the associated force values as outputs and/or dependent variables in order to determine the relationship between such variables.

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for calibrating load sensors installed on an agricultural implement, the system comprising:
   a toolbar
   a frame adjustably coupled to the toolbar;
   a plurality of ground engaging tools supported by the frame;
   a down force actuator coupled to the frame and being configured to adjust a position of the frame relative to the toolbar such that a down force applied through the frame and transmitted to the plurality of ground engaging tools is varied;
   a load sensor provided in operative association with a first ground engaging tool of the plurality of ground engaging tools and being configured to capture load data indicative of a load applied to the first ground engaging tool;
   a controller communicatively coupled to the load sensor, the controller executing a calibration procedure during which the controller:
   controls an operation of the down force actuator such that the down force actuator is moved to a first actuator position at which a first down force is applied through the frame and transmitted to the plurality of ground engaging tools;
   determines a first load value based on the load data received from the load sensor while the down force actuator is disposed at the first actuator position;
   controls the operation of the down force actuator to move the down force actuator from the first actuator position to a second actuator position at which a second down force is applied through the frame and transmitted to the plurality of ground engaging tools;
   determines a second load value based on the load data received from the load sensor while the down force actuator is disposed at the second actuator position; and
   determines a relationship between the first and second load values and corresponding force values associated with the first down force and the second down force.

2. The system of claim 1, wherein the controller is configured to perform a regression analysis to determine the relationship between the first and second load values and the corresponding force values.

3. The system of claim 2, wherein the regression analysis comprises a linear regression analysis or a non-linear regression analysis.

4. The system of claim 1, further comprising an actuator sensor communicatively coupled to the controller, the actuator sensor being separate from the load sensor and configured to detect a parameter indicative of the down force being applied by the down force actuator.

5. The system of claim 4, wherein the down force actuator comprises one of a pneumatic actuator or a hydraulic actuator, the actuator sensor comprising a pressure sensor configured to detect a fluid pressure of fluid supplied to the down force actuator.

6. The system of claim 4, wherein the down force actuator comprises an electrically-actuated actuator, the actuator sensor comprising an electrical input sensor configured to detect an electrical input applied to the down force actuator.

7. The system of claim 4, wherein the controller is configured to determine the corresponding force values associated with the first down force and the second down force based on data received from the actuator sensor.

8. The system of claim 1, wherein one of the first actuator position or the second actuator position comprises a zero load position for the down force actuator such that the respective first down force or second down force is equal to a zero or nominal down force.

9. The system of claim 1, wherein the agricultural implement is a seed-planting implement, and wherein the first ground engaging tool comprises at least one of a residue removal device, gauge wheel, furrow opener, furrow closer, or a press wheel.

10. The system of claim 1, wherein the load sensor comprises at least one strain gauge, load pin, or load cell.

11. A method for calibrating load sensors installed on an agricultural implement, the agricultural implement including a frame, a plurality of ground engaging tools supported by the frame, and a down force actuator coupled to the frame, the down force actuator being configured to adjust a position of the frame such that a down force applied through the frame and transmitted to the plurality of ground engaging tools is varied, the method comprising:
   controlling, with a computing device, an operation of the down force actuator such that the down force actuator is actuated to a first position at which a first down force is applied through the frame and transmitted to the plurality of ground engaging tools
   determining, with the computing device, a first load value indicative of a load being applied to a first ground engaging tool of the plurality of ground engaging tools based on load data received from a load sensor while the down force actuator is disposed at the first actuator position, the load sensor being provided in operative association with the first ground engaging tool;
   controlling, with the computing device, the operation of the down force actuator such that the down force actuator is actuated from the first actuator position to a second actuator position at which a second down force is applied through the frame and transmitted to the plurality of ground engaging tools;
   determining, with the computing device, a second load value indicative of the load being transmitted through the first ground engaging tool based on load data received from the load sensor while the down force actuator is disposed at the second actuator position; and
   determining, with the computing device, a relationship between the first and second load values and corresponding force values associated with the first down force and the second down force.

12. The method of claim 11, wherein determining the relationship between the first and second load values and the corresponding force values comprises performing a regression analysis based on the first and second load values and the corresponding force values.

13. The method of claim 12, wherein performing the regression analysis comprises performing a linear regression analysis or a non-linear regression analysis.

14. The method of claim 11, further comprising determining the corresponding force values associated with the first down force and the second down force based on data received from an actuator sensor, the actuator sensor being separate from the load sensor.

15. The method of claim 14, wherein the down force actuator comprises one of a pneumatic actuator or a hydraulic actuator, the actuator sensor comprising a pressure sensor configured to detect a fluid pressure of fluid supplied to the down force actuator.

16. The method of claim 14, wherein the down force actuator comprises an electrically-actuated actuator, the actuator sensor comprising an electrical input sensor configured to detect an electrical input applied to the down force actuator.

17. The method of claim 11, wherein one of the first actuator position or the second actuator position comprises a zero load position for the down force actuator such that the respective first down force or second down force is equal to a zero or nominal down force.

18. The method of claim 11, wherein the agricultural implement is a seed-planting implement, and wherein the first ground engaging tool comprises at least one of a residue removal device, gauge wheel, furrow opener, furrow closer, or a press wheel.

19. The method of claim 11, wherein the load sensor comprises at least one strain gauge, load pin, or load cell.

20. The method of claim 11, further comprising:
controlling, with the computing device, the operation of the down force actuator such that the down force actuator is actuated from the second actuator position to a third actuator position at which a third down force is applied through the frame and transmitted to the plurality of ground engaging tools; and
determining, with the computing device, a third load value indicative of the load being transmitted through the first ground engaging tool based on load data received from the load sensor while the down force actuator is disposed at the third actuator position,
wherein, determining a relationship between the first and second load values and corresponding force values further comprises determining, with the computing device, a relationship between the first, second, and third load values and corresponding force values associated with the first down force, the second down force, and the third down force.

* * * * *